United States Patent
Sai

(10) Patent No.: US 12,353,533 B2
(45) Date of Patent: Jul. 8, 2025

(54) TERMINAL DEVICE, METHOD, AND STORAGE MEDIUM

(71) Applicant: TOYOTA JIDOSHA KABUSHIKI KAISHA, Toyota (JP)

(72) Inventor: Seii Sai, Yokohama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 387 days.

(21) Appl. No.: 18/052,229

(22) Filed: Nov. 3, 2022

(65) Prior Publication Data

US 2023/0237137 A1 Jul. 27, 2023

(30) Foreign Application Priority Data

Jan. 24, 2022 (JP) .................................. 2022-008965

(51) Int. Cl.
*G06F 21/33* (2013.01)
(52) U.S. Cl.
CPC .................... *G06F 21/33* (2013.01)
(58) Field of Classification Search
CPC .. G06F 21/33; G06Q 20/0457; G06Q 20/387; G06Q 20/4014; G06Q 50/40; G07B 11/00
See application file for complete search history.

(56) References Cited

U.S. PATENT DOCUMENTS

2019/0236852 A1* 8/2019 Ito ........................ G06Q 20/04
2021/0004806 A1* 1/2021 Noe .................... G06Q 20/3278

FOREIGN PATENT DOCUMENTS

| JP | 2002133006 A | 5/2002 |
| JP | 6517409 B1 * | 5/2019 |
| WO | 2018074504 A1 | 4/2018 |

* cited by examiner

*Primary Examiner* — Mohammed Waliullah
(74) *Attorney, Agent, or Firm* — Dickinson Wright, PLLC

(57) ABSTRACT

A terminal device according to this disclosure is a terminal device including a controlling portion, a storage portion, and a communication portion. The controlling portion stores electronic tickets in the storage portion. The controlling portion executes authentication of a user through communication with a server. In a case where the user is authenticated successfully, the controlling portion causes an electronic ticket associated with the user to be displayable from among the electronic tickets stored in the storage portion. In a case where a non-communicable state in which the communication with the server is not performable is established, the controlling portion causes a corresponding electronic ticket to be displayable from among the electronic tickets stored in the storage portion.

7 Claims, 7 Drawing Sheets

TERMINAL DEVICE, METHOD, AND STORAGE MEDIUM

CROSS-REFERENCE TO RELATED APPLICATION

This application claims priority to Japanese Patent Application No. 2022-008965 filed on Jan. 24, 2022, incorporated herein by reference in its entirety.

BACKGROUND

1. Technical Field

This disclosure relates to a terminal device, a method, and a storage medium.

2. Description of Related Art

In the related art, there has been known a technology to manage an electronic ticket in a terminal device. For example, in WO 2018/074504, the face of an electronic ticket is displayed on a terminal device, and when the electronic ticket is used, the face of the electronic ticket displayed on the terminal device is changed.

SUMMARY

Further improvement in utility is demanded for the technology to manage an electronic ticket in a terminal device. For example, in a case where the terminal device communicates with a control center to manage an electronic ticket, when a usage start process on the electronic ticket is not performable between the terminal device and the control center due to a system failure, maintenance, or the like in the control center, the electronic ticket might not be used in the terminal device.

An object of this disclosure accomplished in view of such circumstances is to improve the utility of the technology to manage an electronic ticket in a terminal device.

A terminal device according to one aspect of this disclosure is a terminal device including a controlling portion, a storage portion, and a communication portion. The controlling portion stores electronic tickets in the storage portion. The controlling portion executes authentication of a user through communication with a server. In a case where the user is authenticated successfully, the controlling portion causes an electronic ticket associated with the user to be displayable from among the electronic tickets stored in the storage portion. In a case where a non-communicable state in which the communication with the server is not performable is established, the controlling portion causes a corresponding electronic ticket to be displayable from among the electronic tickets stored in the storage portion.

A method according to one aspect of this disclosure is a method to be executed by a terminal device including a controlling portion, a storage portion, and a communication portion. The method includes: storing electronic tickets in the storage portion; executing authentication of a user through communication with a server; in a case where the user is authenticated successfully, causing an electronic ticket associated with the user to be displayable from among the electronic tickets stored in the storage portion; and in a case where a non-communicable state in which the communication with the server is not performable is established, causing a corresponding electronic ticket to be displayable from among the electronic tickets stored in the storage portion.

A storage medium according to one aspect of this disclosure stores a program causing a computer to execute the followings: storing electronic tickets; executing authentication of a user through communication with a server; in a case where the user is authenticated successfully, causing an electronic ticket associated with the user to be displayable from among the stored electronic tickets; and in a case where a non-communicable state in which the communication with the server is not performable is established, causing a corresponding electronic ticket to be displayable from among the stored electronic tickets.

With any one of the aspects of this disclosure, the utility of the technology to manage an electronic ticket in a terminal device is improved.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

The following describes an embodiment of this disclosure.

Outline of Embodiment

Figure 1:
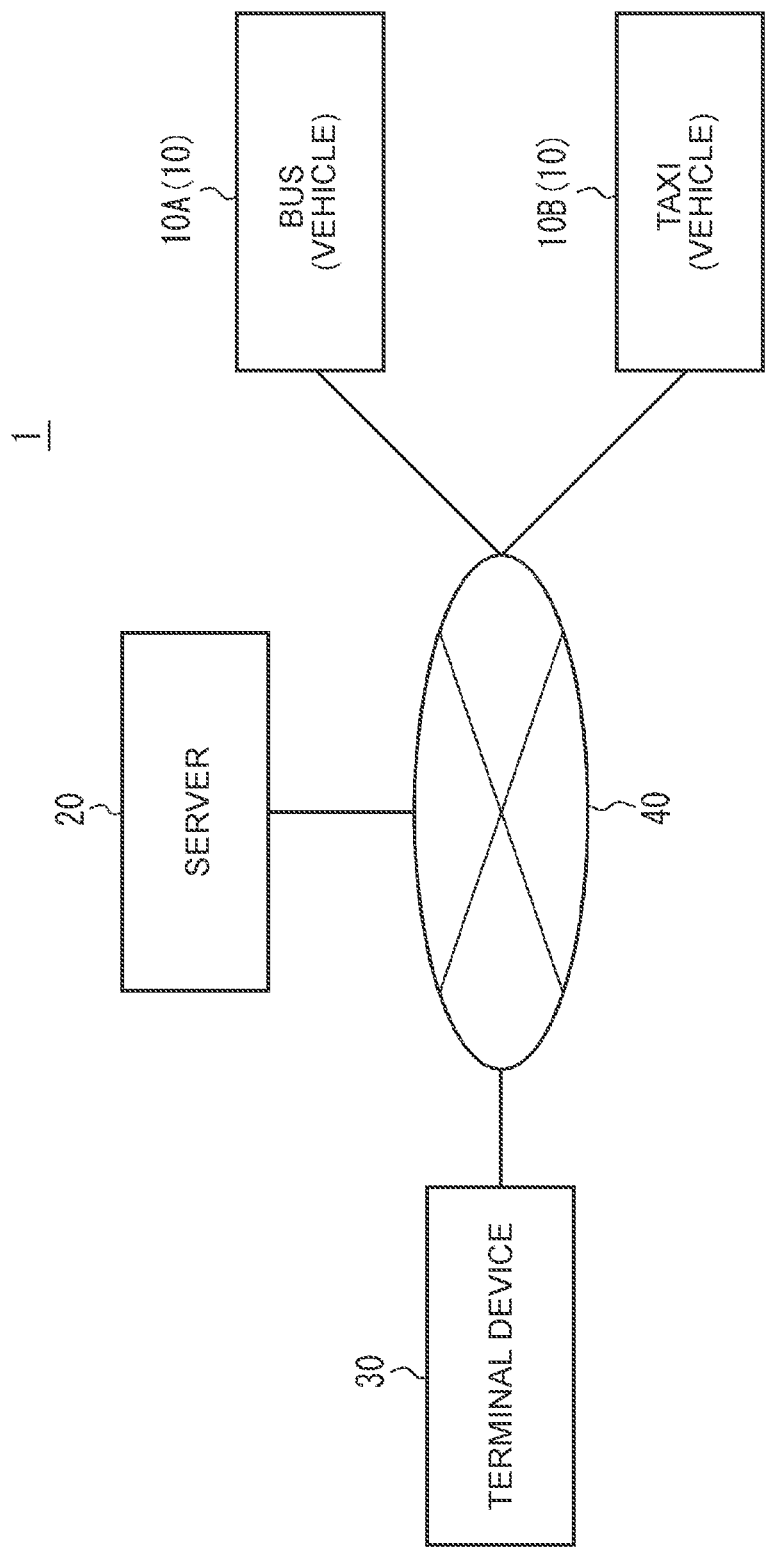
FIG. 1 is a block diagram illustrating a schematic configuration of a system according to one embodiment of this disclosure.

With reference to FIG. 1, the following describes the outline of a system 1 according to one embodiment of this disclosure. FIG. 1 is a block diagram illustrating a schematic configuration of the system 1. The system 1 includes a bus 10A, a taxi 10B, a server 20, and a terminal device 30. Hereinafter, in a case where the bus 10A and the taxi 10B are not particularly distinguished from each other, they are referred to as a vehicle 10 in a collective manner.

The vehicle 10 is a vehicle such as the bus 10A or the taxi 10B, for example. However, the vehicle 10 is not limited to them and may be any vehicle providable to a ride service to pick up and transport a user. Examples of the vehicle include a shared car, a shared bicycle, a train, an airplane, a helicopter, a drone, and so on. Note that the ride service may be a charged service or may be a free service.

The server 20 is constituted by one or more computers communicable with each other. The terminal device 30 is a smartphone, for example. However, the terminal device 30 is not limited to this and may be any computer that a user can possess such as a personal computer, a tablet terminal, or a mobile phone.

In FIG. 1, for simplification of the description, two vehicles 10, one server 20, and one terminal device 30 are illustrated. However, the system 1 may include any number of vehicles 10, any number of servers 20, and any number of terminal devices 30. The vehicle 10, the server 20, and the terminal device 30 are communicably connected to the network 40 including the Internet, a mobile communication network, or the like, for example.

First described is an outline of the present embodiment. Details of the present embodiment will be described later. The system 1 is used as a management system for electronic tickets, for example. For example, the electronic tickets include an electronic ticket used for a ride service provided by the vehicle 10. However, the electronic tickets are not limited to this and may include a given electronic ticket such as a use ticket for a service or a discount coupon. The server 20 is provided in a control center for electronic tickets and is used, for example, for management of the use state of an electronic ticket by a user, distribution of an electronic ticket to the terminal device 30, or management of an electronic ticket distributed to the terminal device 30. In the meantime, the user of an electronic ticket possesses the terminal device 30. The electronic tickets are stored in the terminal device 30. The terminal device 30 executes authentication of the user through communication with the server 20. In a case where the user is authenticated successfully, the terminal device 30 causes an electronic ticket associated with the user to be displayable from among the electronic tickets stored in the terminal device 30. In a case where the terminal device 30 is in a non-communicable state in which the terminal device 30 cannot communicate with the server 20, the terminal device 30 causes a corresponding electronic ticket to be displayable from among the electronic tickets stored in the terminal device 30.

Thus, with the present embodiment, even in a case where the terminal device 30 cannot communicate with the server 20 at the time when the user of an electronic ticket displays the electronic ticket stored in the terminal device 30, the user can display the electronic ticket stored in the terminal device 30. Accordingly, in terms of a point where a period during which the display of the electronic ticket in the terminal device 30 is restricted can be reduced, the utility of the technology to manage the electronic ticket in the terminal device 30 is improved.

Figure 2:
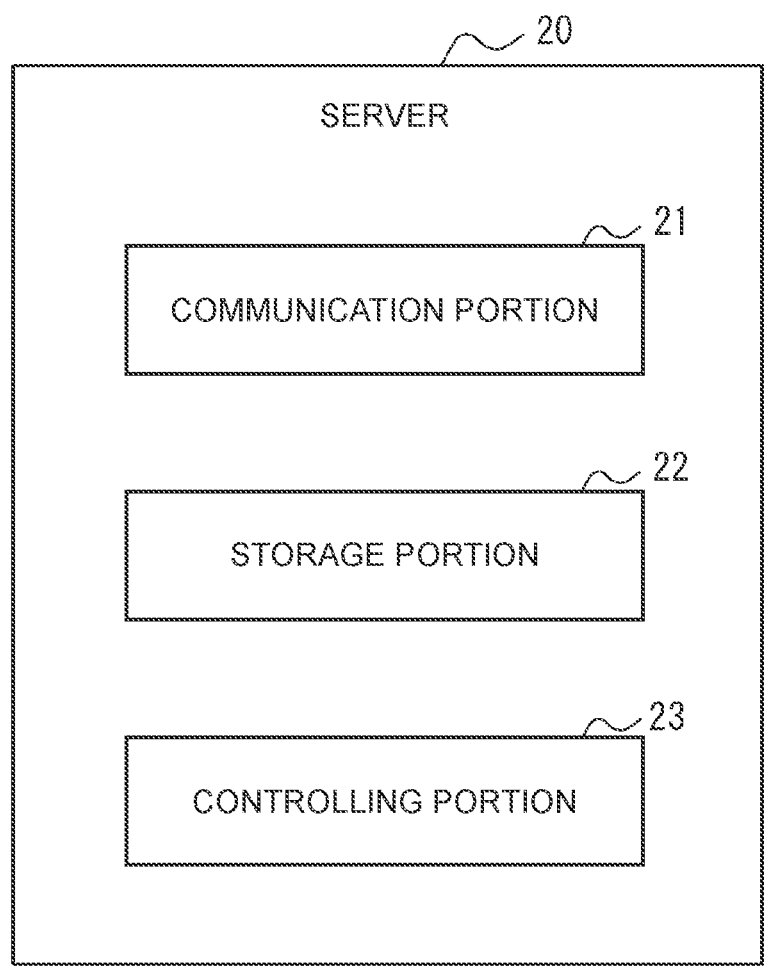
FIG. 2 is a block diagram illustrating a schematic configuration of a server.
Figure 3:
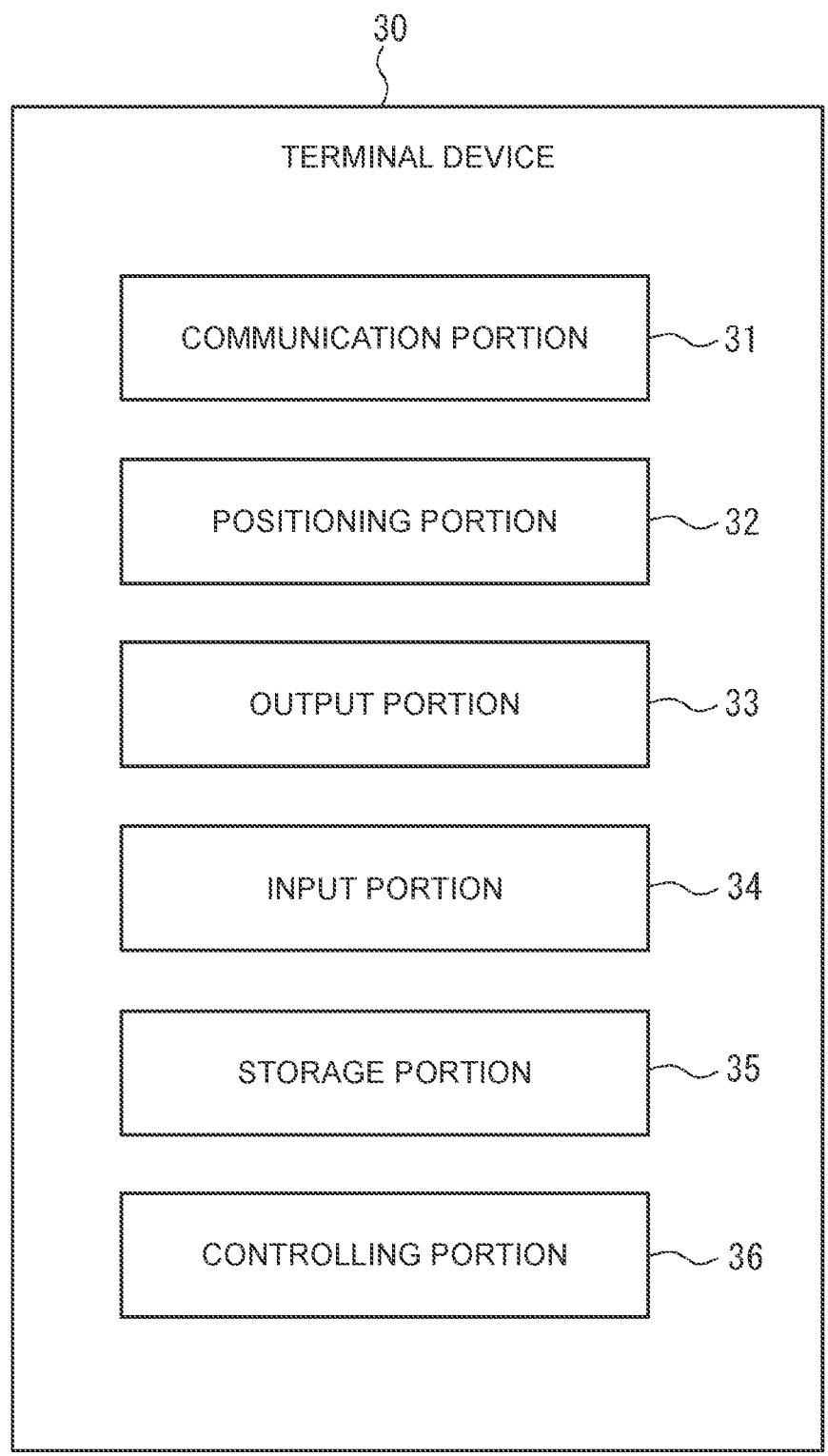
FIG. 3 is a block diagram illustrating a schematic configuration of a terminal device.

Next will be described each constituent of the system 1 in detail with reference to FIGS. 2, 3. FIG. 2 is a block diagram illustrating a schematic configuration of the server 20. FIG. 3 is a block diagram illustrating a schematic configuration of the terminal device 30.

Configuration of Server

As illustrated in FIG. 2, the server 20 includes a communication portion 21, a storage portion 22, and a controlling portion 23.

The communication portion 21 includes one or more communication interfaces connected to the network 40. The communication interface included in the communication portion 21 corresponds to a mobile communications standard, a wired local area network (LAN) standard, or a wireless LAN standard. However, the communication interface is not limited to them and may correspond to any communications standard. In the present embodiment, the server 20 communicates with the vehicle 10 and the terminal device 30 via the communication portion 21 and the network 40. Note that the server 20 may communicate with a computer other than the vehicle 10 and the terminal device 30 according to the present embodiment via the communication portion 21 and the network 40.

The storage portion 22 includes one or more memories. The memories to be included in the storage portion 22 may each function as a main storage device, an auxiliary storage device, or a cache memory, for example. In the storage portion 22, given information to be used for the operation of the server 20 is stored. For example, in the storage portion 22, a system program, an application program, a database, map information, and so on may be stored. The information stored in the storage portion 22 may be updatable by information acquired from the network 40 via the communication portion 21, for example.

The controlling portion 23 includes one or more processors, one or more programmable circuits, one or more dedicated circuits, or a combination thereof. The processor is, for example, a general purpose processor such as a central processing unit (CPU) or a graphics processing unit (GPU), or a dedicated processor that is specialized in a specific process, but the processor is not limited to them. The programmable circuit is a field-programmable gate array (FPGA), for example, but the programmable circuit is not limited to this. The dedicated processor is an application specific integrated circuit (ASIC), for example, but the dedicated processor is not limited to this. The controlling portion 23 controls the operation of the whole server 20.

Configuration of Terminal Device

As illustrated in FIG. 3, the terminal device 30 includes a communication portion 31, a positioning portion 32, an output portion 33, an input portion 34, a storage portion 35, and a controlling portion 36.

The communication portion 31 includes one or more communication interfaces connected to the network 40. The communication interfaces included in the communication portion 31 correspond to a mobile communications standard such as 4th-Generation (4G) or 5th-Generation (5G), for example. However, the communication interfaces are not limited to them and may correspond to any communications standard. In the present embodiment, the terminal device 30 communicates with the vehicle 10 and the server 20 via the communication portion 31 and the network 40. Note that the terminal device 30 may communicate with a computer other than the vehicle 10 and the server 20 according to the present embodiment via the communication portion 31 and the network 40.

The positioning portion 32 includes one or more positioning devices configured to measure the position of the terminal device 30 and acquire position information on the terminal device 30. The position information on the terminal device 30 is coordinates such as two-dimensional or three-dimensional coordinates of a region where the terminal device 30 is located, for example. The positioning portion 32 measures the position of the terminal device 30, for example, by navigation using a satellite positioning system or autonomous navigation. In order to measure the position of the terminal device 30 by the navigation using the satellite positioning system, the positioning portion 32 may include a receiver corresponding to the satellite positioning system. The satellite positioning system to which the receiver corresponds may be, for example, a global positioning system (GPS). In order to measure the position of the terminal device 30 by the autonomous navigation, the positioning portion 32 may include a sensor such as an acceleration sensor or a gyro sensor.

The output portion 33 includes one or more output devices. The output devices included in the output portion 33 are each, for example, a display, a speaker, a vibrator, or the like. The output portion 33 outputs an image, sound, vibrations, or the like.

The input portion 34 includes one input device. The input device included in the input portion 34 is, for example, a touch panel, a camera, a microphone, an IC card leader, or the like. The input portion 34 receives an input operation from a user. The output portion 33 and the input portion 34 may be formed in an integrated manner like a touch panel, for example.

The storage portion 35 includes one or more memories. The memories included in the storage portion 35 may each function as a main storage device, an auxiliary storage device, or a cache memory, for example. In the storage portion 35, given information to be used for the operation of the terminal device 30 is stored. For example, in the storage portion 35, a system program, an application program, embedded software, and so on may be stored. The information stored in the storage portion 35 may be updatable by information acquired from the network 40 via the communication portion 31, for example.

The controlling portion 36 includes one or more processors, one or more programmable circuits, one or more dedicated circuits, or a combination thereof. The processor is a general purpose processor such as a CPU or a GPU, or a dedicated processor that is specialized in a specific process, for example. However, the processor is not limited to them. The programmable circuit is, for example, an FPGA but is not limited to this.

The dedicated circuit is, for example, an ASIC but is not limited to this. The controlling portion 36 controls the operation of the whole terminal device 30.

Operation Procedure of Terminal Device

Figure 4:
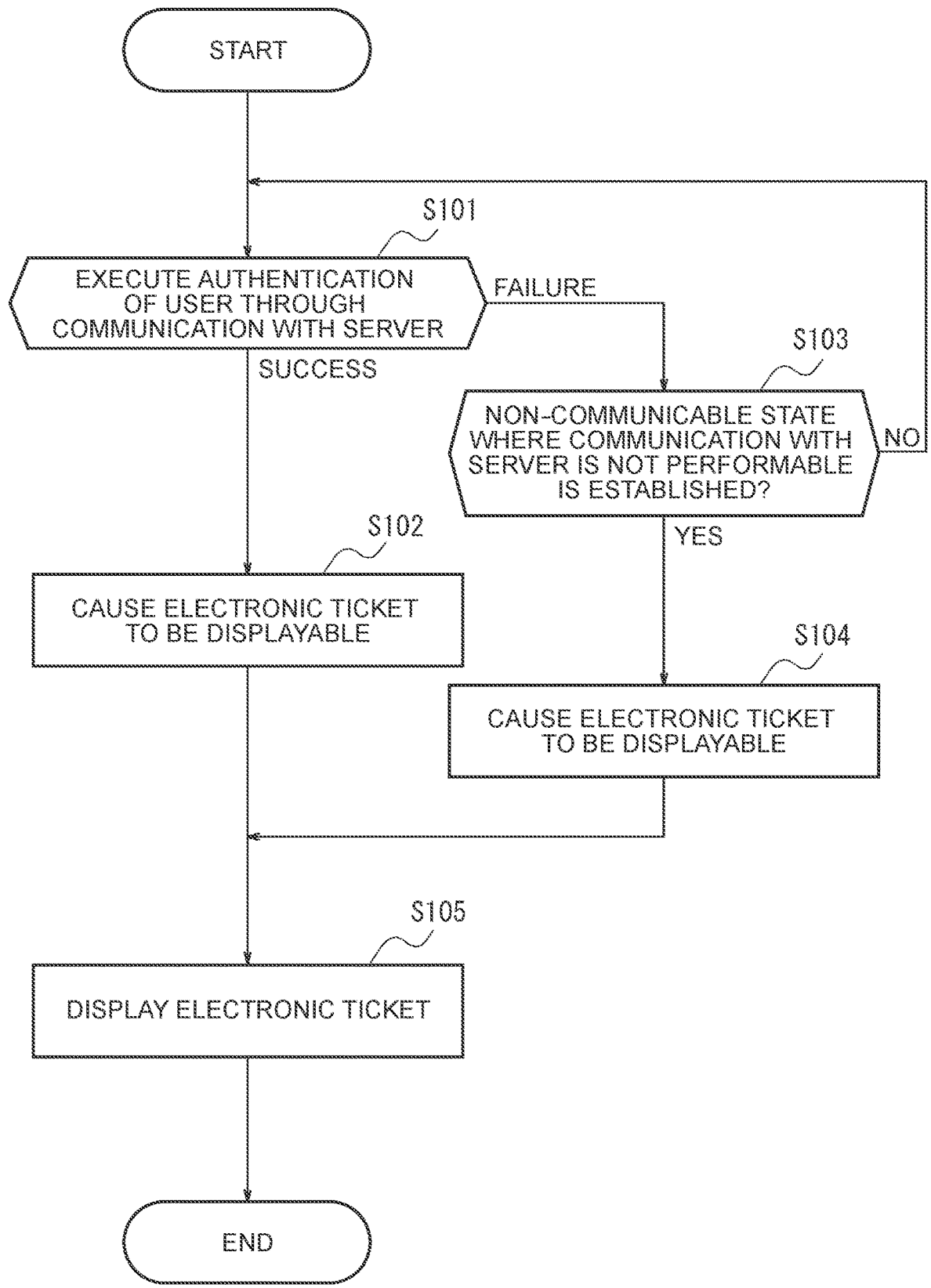
FIG. 4 is a flowchart illustrating an example of the operation of the terminal device.
Figure 5:
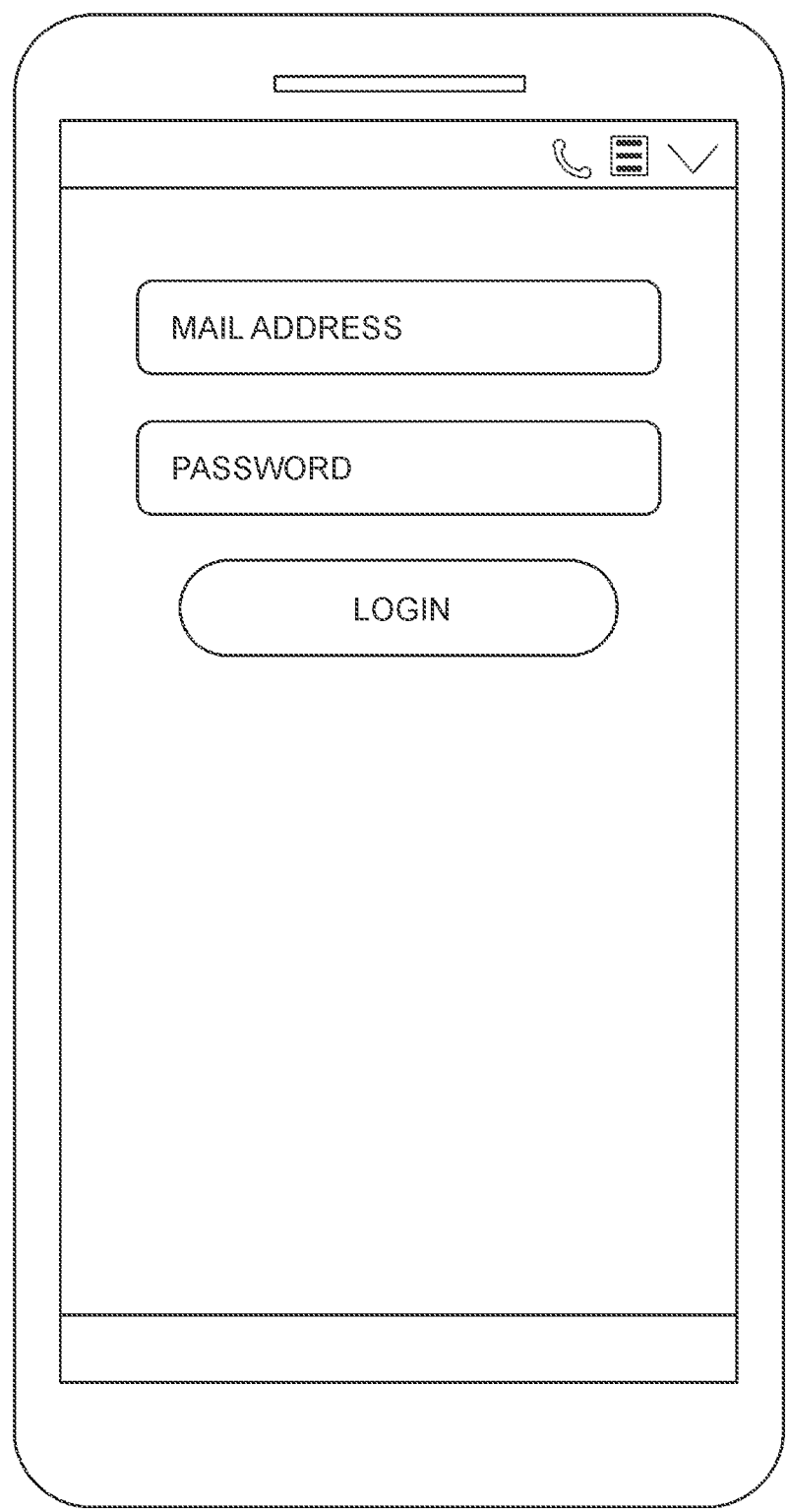
FIG. 5 is a view illustrating an example of a screen displayed on the terminal device.
Figure 6:
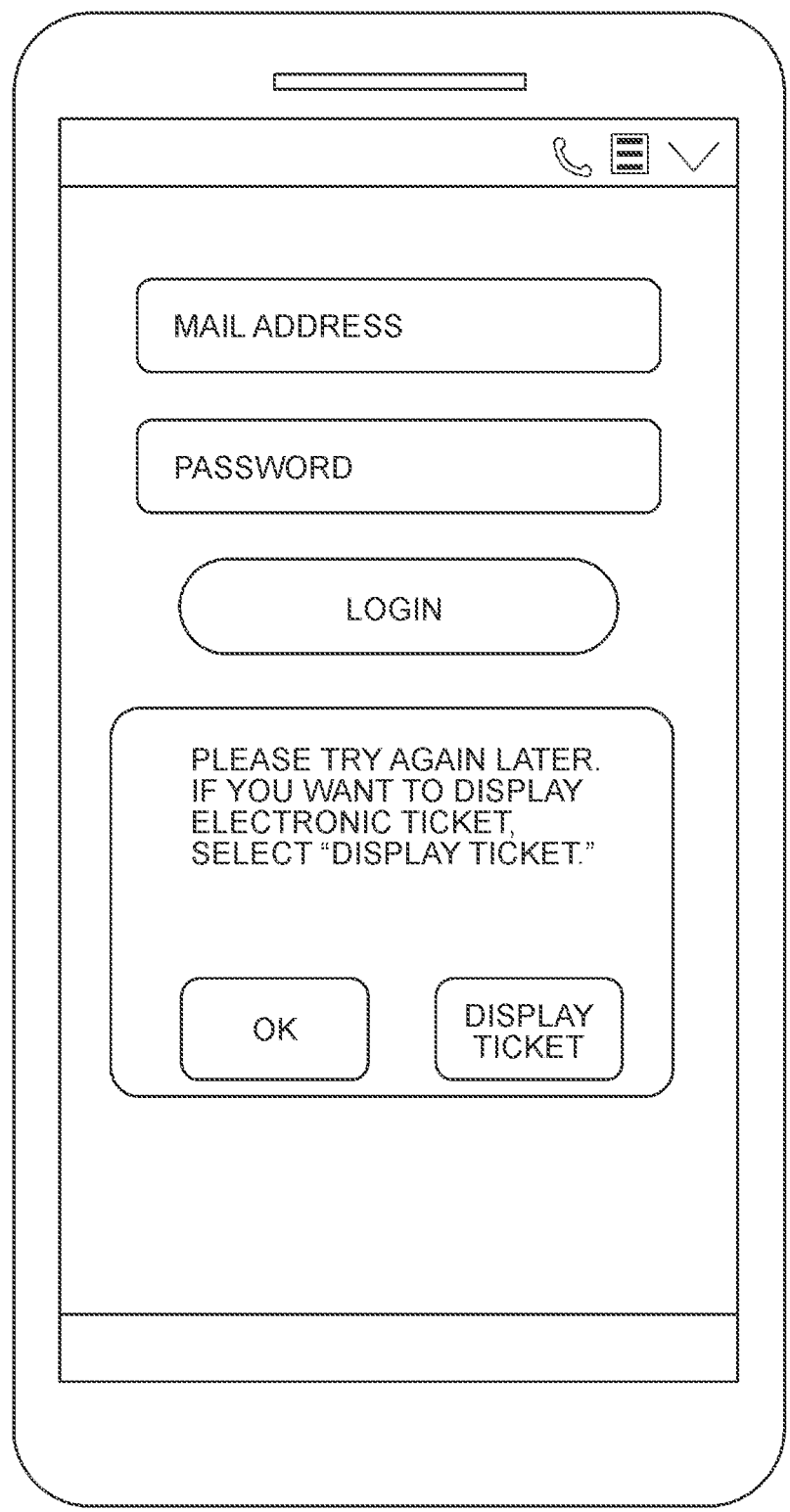
FIG. 6 is a view illustrating an example of the screen displayed on the terminal device.
Figure 7:
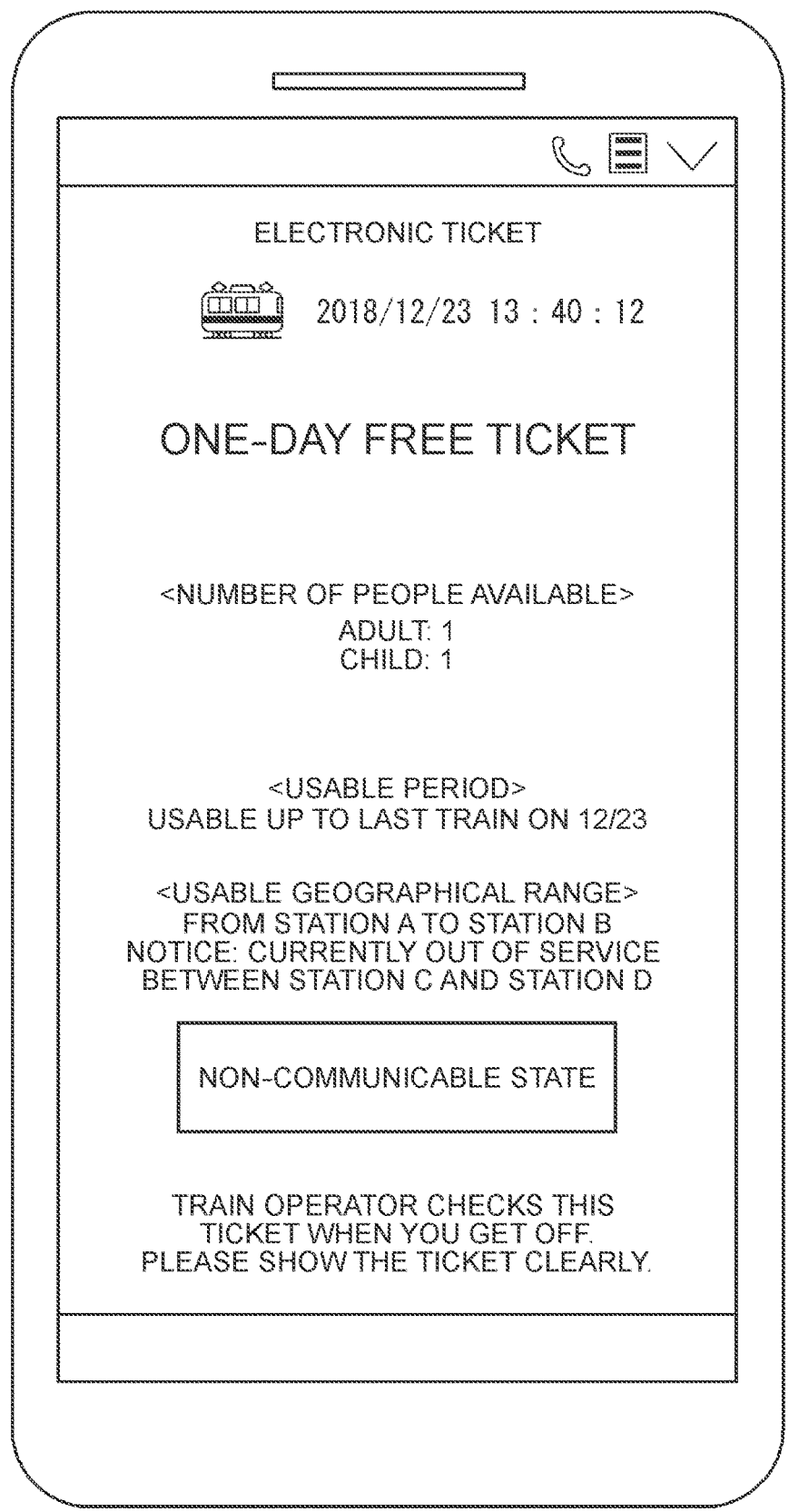
FIG. 7 is a view illustrating an example of the screen displayed on the terminal device.

With reference to FIGS. 4, 5, 6, and 7, the operation of the terminal device 30 in the system 1 according to the present embodiment will be described. FIG. 4 is a flowchart illustrating an example of the operation of the terminal device 30. The operation corresponds to a method to be executed by the terminal device 30 according to the present embodiment. In the description of this operation, the terminal device 30 is configured such that an electronic ticket is stored in the storage portion 35 in advance. Further, the terminal device 30 is configured such that two electronic tickets T1, T2 are stored. FIGS. 5, 6, 7 illustrate examples of a screen displayed on the terminal device 30.

Step S101: The controlling portion 36 of the terminal device 30 executes authentication of a user through the communication with the server 20.

Any method can be employed for the authentication of the user through the communication with the server 20. For example, as illustrated in FIG. 5, the controlling portion 36 may display, on a display as the output portion 33, for example, a login screen on which the user can input identification information (e.g., a registered e-mail address) on the user and a password. The controlling portion 36 transmits an authentication request to authenticate the user to the server 20 via the communication portion 31. The authentication request includes the identification information on the user and the password that are input on the login screen.

Note that the information to be used for the authentication of the user through the communication with the server 20 is not limited to the identification information on the user and the password and may be given information on the user. Further, the controlling portion 36 may execute the authentication of the user through the communication with the server 20 at a given timing. For example, the controlling portion 36 may execute the authentication of the user first when an application for this operation is started in the terminal device 30, or the controlling portion 36 may execute the authentication of the user when the controlling portion 36 receives, via the input portion 34, an input operation to display an electronic ticket.

Step S102: When the user is authenticated successfully (step S101: successful), the controlling portion 36 of the terminal device 30 causes an electronic ticket associated with the user to be displayable.

In a case where the controlling portion 36 receives, from the server 20, an authentication result indicating that the authentication of the user is executed normally in response to the authentication request to authenticate the user that is transmitted to the server 20, the controlling portion 36 determines that the user is authenticated successfully. In this case, the controlling portion 36 stores, in the storage portion 35, information indicating that the user is successfully authenticated, as history information on the authentication of the user together with the identification information on the user, an execution time, the received authentication result, and so on. In a case where the user is successfully authenticated, the controlling portion 36 causes an electronic ticket stored in the storage portion 35 to be displayable. As will be described later with reference to step S104, the controlling portion 36 may cause only an electronic ticket satisfying a predetermined condition to be displayable from among the electronic tickets stored in the storage portion 35. The predetermined condition is, for example, a condition that the electronic ticket has been already subjected to a usage start process, a condition that the electronic ticket is associated with the latest successfully authenticated user, a condition that a usable period does not expire, a condition that position information on the terminal device 30 is included in a geographical range associated with the electronic ticket, a condition that one or more vehicles 10 available by the electronic ticket are in service, or a combination of any of these conditions. Note that the controlling portion 36 may cause all the electronic tickets stored in the storage portion 35 to be displayable.

Step S103: In a case where the authentication of the user fails (step S101: failure), the controlling portion 36 of the terminal device 30 determines whether a non-communicable state in which the communication with the server 20 is not performable is established or not. Hereinafter, the state where the communication with the server 20 is not performable is also just referred to as the "non-communicable state."

In a case where the controlling portion 36 does not receive, from the server 20, an authentication result indicating that the authentication of the user is executed normally in response to the authentication request to authenticate the user that is transmitted to the server 20, the controlling portion 36 determines that the authentication of the user fails. In this case, the controlling portion 36 stores, in the storage portion 35, information indicating that the authentication fails, as history information on the authentication of the user together with the identification information on the user, the execution time, a reason of the failure, and so on. In a case where the authentication of the user fails, the controlling portion 36 determines whether the non-communicable state in which the communication with the server 20 is not performable is established or not.

A given technique can be employed for the determination on whether the non-communicable state in which the communication with the server 20 is not performable is established or not. For example, in a case where the controlling portion 36 receives, from the server 20, an authentication result indicating that the authentication of the user fails in response to the authentication request to authenticate the user that is transmitted to the server 20, the controlling portion 36 determines that the non-communicable state is not established. In the meantime, in a case where the controlling portion 36 cannot receive an authentication result to the authentication request to authenticate the user for a predetermined period, or in a case where the controlling portion 36 receives a notification indicating that the server 20 does not work normally due to a system failure, maintenance, or the like, the controlling portion 36 determines that the non-communicable state is established. In this case, the controlling portion 36 may store, in the storage portion 35, information indicating that the authentication has failed due to the non-communicable state as history information on the authentication of the user.

In a case where the controlling portion 36 of the terminal device 30 determines that the non-communicable state is not established (step S103: NO), the controlling portion 36 executes the process of step S101 again.

In a case where the controlling portion 36 receives, from the server 20, an authentication result indicating that the authentication of the user has failed as an authentication result in response to the authentication request to authenticate the user, the controlling portion 36 may display the login screen illustrated in FIG. 5 on the display again so as to display a message indicating that the authentication of the user has failed.

Step S104: In a case where the non-communicable state where the communication with the server 20 is not performable is established (step S103: YES), the controlling portion 36 of the terminal device 30 causes the electronic ticket stored in the storage portion 35 to be displayable.

A given technique can be employed to cause the electronic ticket to be displayable. For example, the controlling portion 36 may store, in association with the electronic ticket stored in the storage portion 35, information indicating that the electronic ticket is displayable. At the time when the controlling portion 36 causes the electronic ticket to be displayable, the controlling portion 36 may display, on the display, a screen to ask whether or not the electronic ticket is made displayable via the output portion 33 as illustrated in FIG. 6. In a case where the controlling portion 36 receives, via the input portion 34, an input operation to cause the electronic ticket to be displayable when the user selects a button indicative of "DISPLAY TICKET" as illustrated in FIG. 6, for example, the controlling portion 36 may cause the electronic ticket to be displayable. Hereby, it is possible to decrease the probability that the electronic ticket becomes displayable on the terminal device 30 without the intention of the user.

As will be described later, the controlling portion 36 may cause only an electronic ticket satisfying a predetermined condition to be displayable from among the electronic tickets stored in the storage portion 35. The predetermined condition is, for example, a condition that the electronic ticket has been already subjected to the usage start process, a condition that the electronic ticket is associated with the latest successfully authenticated user, a condition that a usable period does not expire, a condition that position information on the terminal device 30 is included in a geographical range associated with the electronic ticket, a condition that one or more vehicles 10 available by the electronic ticket are in service, or a combination of any of these conditions. Note that, in a case where the non-communicable state where the communication with the server 20 is not performable is established, the controlling portion 36 may cause all the electronic tickets stored in the storage portion 35 to be displayable.

In step S104, in a case where the non-communicable state is established, the controlling portion 36 may cause only an electronic ticket to be displayable, the electronic ticket having been subjected to the usage start process executed through the communication with the server 20 from among the electronic tickets stored in the storage portion 35.

In the present embodiment, the electronic tickets stored in the storage portion 35 of the terminal device 30 are electronic tickets that are changed to a usable state by executing the usage start process on the electronic tickets through the communication with the server 20. The controlling portion 36 may execute the usage start process on an electronic ticket and store information indicating that the electronic ticket has been subjected to the usage start process, in association with the electronic ticket stored in the storage portion 35. Hereby, the server 20 can grasp usage states of the electronic tickets in the terminal device 30. Thus, the electronic ticket to be made displayable in the non-communicable state with the server 20 in the terminal device 30 is limited to an electronic ticket the usage start of which is also grasped by the server 20. Hereby, it is possible to prevent falsification or unauthorized use of the electronic ticket in the terminal device 30. In this disclosure, that "an electronic ticket has been subjected to the usage start process" indicates that the usage start process on the electronic ticket through the communication with the server 20 has been executed normally in the terminal device 30.

Among the electronic tickets stored in the storage portion 35, the controlling portion 36 may cause an electronic ticket to be displayable, the electronic ticket being associated with information indicating that the electronic ticket has been subjected to the usage start process. Note that the electronic ticket may be an electronic ticket that does not require the usage start process on the electronic ticket through the communication with the server 20.

In step S104, in a case where the non-communicable state is established, the controlling portion 36 may cause an electronic ticket to be displayable, the electronic ticket being associated with the latest successfully authenticated user from among the electronic tickets stored in the storage portion 35.

The controlling portion 36 may store, in association with the electronic ticket stored in the storage portion 35, information on a user for whom the electronic ticket is displayable. The controlling portion 36 may determine the latest successfully authenticated user based on history information on authentication of users that is stored in the storage portion 35 and cause an electronic ticket to be displayable, the electronic ticket being associated with the latest successfully authenticated user. Hereby, in a case where a plurality of users uses one terminal device 30 in common, an electronic ticket to be made displayable in the non-communicable state with the server 20 is limited to an electronic ticket associated with the latest successfully authenticated user, thereby making it possible to prevent the user from mistakenly recognizing, as a usable electronic ticket, an electronic ticket that the user is not allowed to use properly. Note that the controlling portion 36 may cause an electronic ticket to be displayable, the electronic ticket being associated with a user other than the latest successfully authenticated user. For example, the user other than the latest successfully authenticated user may be a user specified by an input operation via the input portion 34, a user registered as an owner of the terminal device 30, or the like.

In step S104, in a case where the usable period associated with the electronic ticket expires, the controlling portion 36 restricts the display of the electronic ticket.

The controlling portion 36 may store, in association with the electronic ticket stored in the storage portion 35, the usable period of the electric ticket. The usable period includes, for example, a usage start date, a usage end date, the number of usable days, a usable time, and so on of the electronic ticket. For example, the controlling portion 36 may start to manage the usable period of the electronic ticket by the usage start process on the electronic ticket. The controlling portion 36 may determine whether the usable period associated with the electronic ticket expires or not, based on the usable period of the electronic ticket that is stored in the storage portion 35. In a case where the usable period associated with the electronic ticket expires, the controlling portion 36 restricts the display of the electronic ticket. Hereby, the controlling portion 36 can prevent beforehand the user from mistakenly recognizing, as a usable electronic ticket, an electronic ticket that the user is not allowed to use.

A given technique can be employed to restrict the display of the electronic ticket. For example, the controlling portion 36 may restrict the display of the electronic ticket by not causing the electronic ticket to be displayable. Further, for example, the controlling portion 36 may restrict the number of times or a period during which the electronic ticket is made displayable. Alternatively, the controlling portion 36 may provide a restriction on information to be displayed as the electronic ticket. At the time when the electronic ticket is displayed, the controlling portion 36 may display, together with the electronic ticket, information indicating that the display of the electronic ticket is restricted.

In step S104, the controlling portion 36 acquires position information of the terminal device 30, and in a case where the position information on the terminal device 30 is not included in a geographical range associated with the electronic ticket, the controlling portion 36 restricts the display of the electronic ticket.

The controlling portion 36 may store, in association with the electronic ticket stored in the storage portion 35, the geographical range where the electronic ticket is usable. The geographical range where the electronic ticket is usable is a geographical range where the user can take the vehicle 10 by the electronic ticket, for example. The controlling portion 36 may acquire the position information on the terminal device 30 by means of the positioning portion 32 and determine whether or not the position information on the terminal device 30 is included in the geographical range associated with the electronic ticket. In a case where the position information on the terminal device 30 is not included in the geographical range associated with the electronic ticket, the controlling portion 36 restricts the display of the electronic ticket. Hereby, it is possible to prevent beforehand the user from mistakenly recognizing, as a usable electronic ticket, an electronic ticket that the user is not allowed to use.

In step S104, the controlling portion 36 acquires the operation state of one or more vehicles 10 available by the electronic ticket, and in a case where the one or more vehicles are out of service, the controlling portion 36 restricts the display of the electronic ticket.

A given technique can be employed to acquire the operation state of one or more vehicles 10 available by the electronic ticket. For example, the controlling portion 36 may store, in association with the electronic ticket stored in the storage portion 35, information on the one or more vehicles 10 available by the electronic ticket. The controlling portion 36 may access an external server that provides the operation state of the one or more vehicles 10 available by the electronic ticket via the communication portion 31 and acquire the operation state of the one or more vehicles 10. In a case where the one or more vehicles 10 available by the electronic ticket are out of service, the controlling portion 36 restricts the display of the electronic ticket. Hereby, it is possible to prevent beforehand the user from mistakenly recognizing that the user can use an electronic ticket that is not usable by the user due to off-hours, suspended service due to disaster, or the like. For example, it is possible to prevent beforehand such a situation that, after the user moves to a station or the like for the vehicle 10 available by the electronic ticket so as to take the vehicle 10, the user finds that the vehicle 10 is out of service. In a case where a plurality of vehicles 10 is available by an electronic ticket, the controlling portion 36 may restrict the display of the electronic ticket when all the vehicles 10 are out of service, or the controlling portion 36 may restrict the display of the electronic ticket when at least one of the vehicles 10 is out of service. For example, the controlling portion 36 may restrict the display of the electronic ticket by displaying, together with the electronic ticket, information on the vehicle 10 that is out of service from among the vehicles 10 available by the electronic ticket.

Step S105: The controlling portion 36 of the terminal device 30 displays the electronic ticket.

A given technique can be employed to display the electronic ticket. For example, as illustrated in FIG. 7, the controlling portion 36 displays, via the output portion 33, the electronic ticket made displayable from among the electronic tickets stored in the storage portion 35. Alternatively, the controlling portion 36 may display, via the output portion 33, a list of electronic tickets made displayable from among the electronic tickets stored in the storage portion 35.

In step S105, in a case where the electronic ticket is displayed in the non-communicable state, the controlling portion 36 may display the electronic ticket such that the non-communicable state is noticeable.

A given technique can be employed to display the electronic ticket such that the non-communicable state is noticeable. As illustrated in FIG. 7, for example, the controlling portion 36 may display the electronic ticket such that the non-communicable state is noticeable, by displaying "NON-COMMUNICABLE STATE" on the electronic ticket displayed via the output portion 33. Alternatively, the controlling portion 36 may display the electronic ticket such that the non-communicable state is noticeable, by stopping the motion of an icon (a train icon in the example illustrated in FIG. 7) on the electronic ticket displayed via the output portion 33, the icon being configured to move in a state where the communication with the server 20 is performable, or by stopping or hiding a current time on the electronic ticket displayed via the output portion 33, the current time being displayed dynamically in a case where the communication with the server 20 is performable. Hereby, the user of the electronic ticket or a staff who checks the electronic ticket can easily visually recognize that the electronic ticket is displayed in the non-communicable state on the terminal device 30. In a case where the communication with the server 20 becomes performable and the user is authenticated successfully, the controlling portion 36 may return to normal display of the electronic ticket by ending the display of the electronic ticket displayed such that the non-communicable state is noticeable.

In step S105, the controlling portion 36 may record history information on the display of the electronic ticket in the non-communicable state, and after the non-communicable state is ended, the controlling portion 36 may transmit the history information to the server 20.

In a case where the electronic ticket is displayed in the non-communicable state, the controlling portion 36 may store, in the storage portion 35, the identification information on the user, a display time, identification information on the electronic ticket, and so on, as the history information on the display of the electronic ticket in the non-communicable state. Hereby, it is possible to retroactively check information on electronic tickets displayed in the non-communicable state on the terminal device 30. Accordingly, the utility of the technology to manage the electronic ticket in the terminal device 30 is improved.

The controlling portion 36 may transmit, to the server 20 via the communication portion 31 and the network 40, the history information on the display of the electronic ticket in the non-communicable state after the non-communicable state is ended. Hereby, in the server 20, the history information is usable for the purpose of management of usage history of electronic tickets by the user, detection of unauthorized use, and the like.

As described earlier, electronic tickets are stored in the terminal device 30 according to the present embodiment. The terminal device 30 executes authentication of a user through the communication with the server 20, and when the user is authenticated successfully, the terminal device 30 causes an electronic ticket associated with the user to be displayable from among the electronic tickets stored in the terminal device 30. In a case where the terminal device 30 is in the non-communicable state where the terminal device 30 cannot communicate with the server 20, the terminal device 30 causes a corresponding electronic ticket to be displayable from among the electronic tickets stored in the terminal device 30.

In such a configuration, in a case where the user of an electronic ticket stored in the terminal device 30 displays the electronic ticket stored in the terminal device 30, even when the terminal device 30 cannot communicate with the server 20, the user can display the electronic ticket stored in the terminal device 30. Accordingly, in terms of a point where a period during which the display of the electronic ticket in the terminal device 30 is restricted can be reduced, the utility of the technology to manage the electronic ticket in the terminal device 30 is improved.

This disclosure is described based on the drawings and the embodiment, but it should be noted that a person skilled in the art can easily make various modifications and alterations based on this disclosure. Accordingly, it should be noted that these modifications and alterations are included in the scope of this disclosure. For example, the constituents, functions and the like included the steps, and the like can be rearranged within a range where the rearrangement is not logically inconsistent, and a plurality of constituents, steps, and the like may be combined into one or may be divided.

For example, a general-purpose computer may be functionalized as the terminal device 30 according to the above embodiment. More specifically, a program in which a process content to implement each function of the terminal device 30 according to the above embodiment is described is stored in a memory of the general-purpose computer and read and executed by a processor. Accordingly, this disclosure can be also implemented as a program executable by a processor or a non-transitory computer readable medium (storage medium) in which the program is stored.

What is claimed is:

1. A terminal device comprising
a controlling portion;
a storage portion; and
a communication portion, wherein:
the controlling portion stores electronic tickets in the storage portion;
the controlling portion executes authentication of a user through communication with a server;
in a case where the user is authenticated successfully, the controlling portion causes an electronic ticket associated with the user to be displayable from among the electronic tickets stored in the storage portion;
in a case where a non-communicable state in which the communication with the server is not performable is established, the controlling portion causes the electronic ticket to be displayable from among the electronic tickets stored in the storage portion;
the controlling portion acquires an operation state of one or more vehicles available by the electronic ticket to be displayed from among the electronic tickets stored in the storage portion; and
in a case where the one or more vehicles are out of service, the controlling portion restricts display of the electronic ticket.

2. The terminal device according to claim 1, wherein, in a case where the controlling portion displays an electronic ticket in the non-communicable state from among the electronic tickets stored in the storage portion, the controlling portion displays the electronic ticket such that the non-communicable state is noticeable.

3. The terminal device according to claim 1, wherein:
the controlling portion records history information on display of an electronic ticket displayed in the non-communicable state from among the electronic tickets stored in the storage portion; and
after the non-communicable state is ended, the controlling portion transmits the history information to the server.

4. A method to be executed by a terminal device including a controlling portion, a storage portion, a communication portion, the method comprising:
storing electronic tickets in the storage portion;
executing authentication of a user through communication with a server;
in a case where the user is authenticated successfully, causing an electronic ticket associated with the user to be displayable from among the electronic tickets stored in the storage portion;
in a case where a non-communicable state in which the communication with the server is not performable is established, causing the electronic ticket to be displayable from among the electronic tickets stored in the storage portion;
acquiring an operation state of one or more vehicles available by the electronic ticket to be displayed from among the electronic tickets stored in the storage portion; and
in a case where the one or more vehicles are out of service, restricting display of the electronic ticket.

5. The method according to claim 4, comprising, in a case where an electronic ticket is displayed in the non-communicable state from among the electronic tickets stored in the storage portion, displaying the electronic ticket such that the non-communicable state is noticeable.

6. The method of claim 4, comprising:
recording history information on display of an electronic ticket displayed in the non-communicable state from among the electronic tickets stored in the storage portion; and
after the non-communicable state is ended, transmitting the history information to the server.

7. A non-transitory storage medium that stores a program causing a computer to execute the following:
storing electronic tickets;
executing authentication of a user through communication with a server;
in a case where the user is authenticated successfully, causing an electronic ticket associated with the user to be displayable from among the stored electronic tickets;
in a case where a non-communicable state in which the communication with the server is not performable is established, causing the electronic ticket to be displayable from among the stored electronic tickets;
acquiring an operation state of one or more vehicles available by the electronic ticket to be displayed from among the electronic tickets stored in the storage portion; and
in a case where the one or more vehicles are out of service, restricting display of the electronic ticket.

* * * * *